(12) United States Patent
Chen

(10) Patent No.: US 10,247,353 B1
(45) Date of Patent: Apr. 2, 2019

(54) TRIPOD

(71) Applicant: SHIN TAI SPURT WATER OF THE GARDEN TOOLS CO., LTD., Lu-Kang Town, Chang-Hua Hsien (TW)

(72) Inventor: Chin-Yuan Chen, Chang-Hua-Hsien (TW)

(73) Assignee: SHIN TAI SPURT WATER OF THE GARDEN TOOLS CO., LTD., Chang-Hua Hsien (TW)

( * ) Notice: Subject to any disclaimer, the term of this patent is extended or adjusted under 35 U.S.C. 154(b) by 0 days.

(21) Appl. No.: 15/871,872

(22) Filed: Jan. 15, 2018

(51) Int. Cl.
| | |
|---|---|
| *A47F 5/00* | (2006.01) |
| *F16M 11/28* | (2006.01) |
| *F16M 13/02* | (2006.01) |
| *F16M 11/04* | (2006.01) |
| *F16M 11/10* | (2006.01) |
| *A01G 7/00* | (2006.01) |
| *G03B 17/56* | (2006.01) |
| *F16B 2/12* | (2006.01) |

(52) U.S. Cl.
CPC .............. *F16M 11/28* (2013.01); *A01G 7/00* (2013.01); *F16B 2/12* (2013.01); *F16M 11/041* (2013.01); *F16M 11/10* (2013.01); *F16M 13/02* (2013.01); *G03B 17/561* (2013.01); *F16M 2200/021* (2013.01)

(58) Field of Classification Search
CPC ..... F16M 11/28; F16M 11/041; G03B 17/561
USPC ........ 248/122.1; 348/77, 373, 376; 396/419, 396/425, 428
See application file for complete search history.

(56) References Cited

U.S. PATENT DOCUMENTS

| | | | | |
|---|---|---|---|---|
| 4,530,580 A | * | 7/1985 | Ueda ...................... | F16M 13/04 248/187.1 |
| 9,170,473 B1 | * | 10/2015 | Li ........................... | F16M 11/28 |
| 9,851,625 B1 | * | 12/2017 | Fernandez ........... | G03B 17/561 |
| 2015/0316837 A1 | * | 11/2015 | Maltese ................ | F16M 13/04 294/139 |
| 2017/0009802 A1 | * | 1/2017 | Uke ..................... | G03B 17/561 |

* cited by examiner

*Primary Examiner* — Todd M Epps

(57) ABSTRACT

A tripod has an outer tube, a central tube, an inner tube, two positioning pins, a connecting joint, a knob, a clamping device and a leg set. The outer tube, the intermediate tube and the inner tube are sequentially socketed. The inner tube has a first engaging disk with a through aperture. The connecting joint extends above a locking rod and has a second engaging disk with a bolt. The knob is provided with a threaded aperture. The clamping device has a back member and a side member, and a first locking aperture and a second locking aperture are respectively provided on the back member and the side member. The supporting legs are provided on the leg set, each of the supporting legs has a first surface and a second surface, and the second surface is provided with a recess containing a pivotal grounding nail.

5 Claims, 8 Drawing Sheets

TRIPOD

BACKGROUND OF THE INVENTION

1. Field of the Invention

The present invention relates to a tripod, and more particularly to a tripod for an image capture device used for recording plant growth.

2. Description of the Related Art

Due to the traditional Selfie handheld design is not ideal for recording and shooting images for long period of time such as plant growth. Currently on the market, tripods are also developed for the camera; so if you can develop a special mobile phone tripod structure, and the tripod structure also has the function of tripods, so that the general mobile phone can also be used for recording and shooting images for long period of time such as plant growth.

Therefore, it is desirable to provide a tripod to mitigate and/or obviate the aforementioned problems.

SUMMARY OF INVENTION

An objective of present invention is to provide tripod which is capable of improving the above-mention problems.

In order to achieve the above mentioned objective, a tripod comprising: an outer tube, an intermediate tube, an inner tube, at least two positioning members, a connecting joint, a knob, a clamping device and a leg set. The outer tube, the intermediate tube and the inner tube are sequentially and slidably sleeved onto each other, and a positioning member is respectively disposed between the outer tube and the intermediate tube, and the intermediate tube and the inner tube. The inner tube is provided with a first engaging disk having a through aperture. The connecting joint is provided with a locking rod and a second engaging disk having a bolt, the bolt passing through the through aperture of the first engaging disk such that the connecting joint is pivoted onto the first engaging disk of the inner tube. The knob further includes a threaded aperture configured for engaging with the bolt after the first engaging disk, such that the connecting joint can be clamped and fixed onto the first engaging disk by the second engaging disk and the knob. The clamping device comprises a back member, a side member and a slidable member, the back member and the side member are respectively provided with a first locking aperture and a second locking aperture configured for engaging with the locking rod of the connecting joint; and the leg set is secured below the outer tube and includes a plurality of supporting legs, each supporting leg comprising a first surface and a second surface, and the second surface is provided with an recess containing a pivotal grounding nail.

Other objects, advantages, and novel features of invention will become more apparent from the following detailed description when taken in conjunction with the accompanying drawings.

DETAILED DESCRIPTION OF PREFERRED EMBODIMENT

Figure 8:
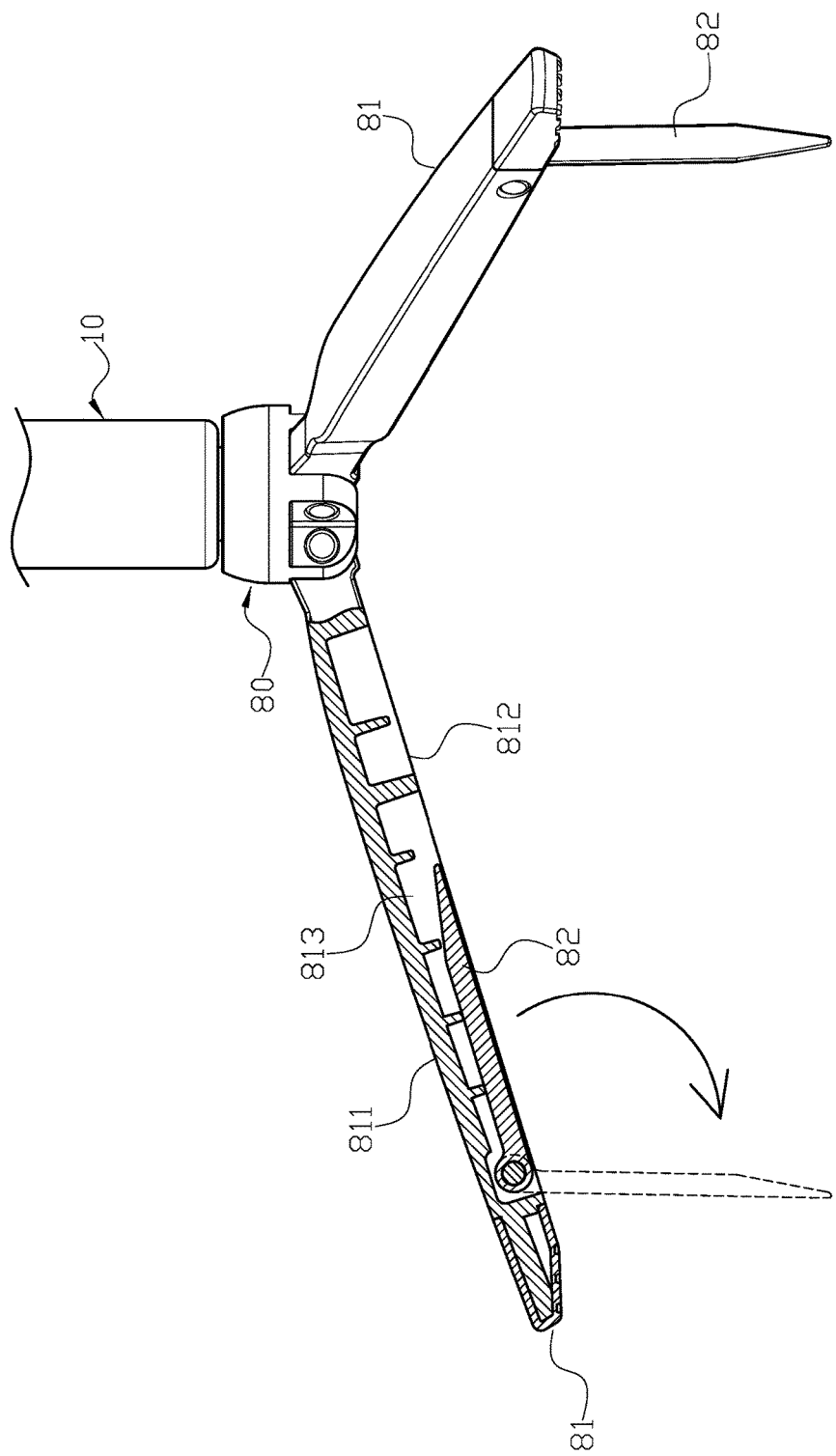
FIG. 8 shows the grounding nail rotated out of the recess according to the embodiment of the present invention.

First, please refer to FIG. 1 to FIG. 6. The tripod comprises: an outer tube 10, an intermediate tube 20, an inner tube 30, two positioning members 40, a connecting joint 50, a knob 60, a clamping device 70 and a leg set 80. The outer tube 10, the intermediate tube 20 and the inner tube 30 are sequentially sleeved on each other so that the intermediate tube 20 can perform coaxial telescopic movement along the inner tube of the outer tube 10 inside the outer tube 10. And the inner tube 30 can expand and contract coaxially along the intermediate tube 20. Furthermore, the outer tube 10 and the intermediate tube 20 are combined with a positioning member 40, and the intermediate tube 20 and the inner tube 30 are also combined with a positioning member 40. By controlling the positioning member 40 loosened or locked, the intermediate tube 20 or the inner tube 30 can be fixed after the telescopic movement. Moreover, the inner tube 30 is provided with a first engaging disk 31 and the first engaging disk 31 has a through aperture 311 at the center. A locking rod 51 extends above the connecting joint 50 and a second engaging disk 52 is disposed at one side of the connecting joint 50 and provided with a bolt 53. The bolt 53 penetrates the through aperture 311 and then protrudes from the other side of the first engaging disk 31 so that the connecting joint 50 can be pivoted on the first engaging disk 31 of the inner tube 30 by the insertion of the bolt 53. The knob 60 has a threaded aperture 61 configured for engaging with the bolt 53 on the other side of the first engaging disk 31 such that the connecting joint 50 can be adjusted to a predetermined angle on the first engaging disk 31. Then, the second engaging disk 52 and the knob 60 together clamp and position the connecting joint 50 on the first engaging disk 31. The clamping device 70 has a back member 71, a side member 72 and a slidable member 73. A first locking aperture 711 and a second locking aperture 721 are respectively disposed on the side member 72 and the back member 71, and one of locking apertures is utilizes for engaging with the locking rod 51 of the connecting joint 50 to lock the clamping device 70. Therefore, the image capture device 90 is able to be mounted in different directions. The leg set 80 is mounted below the outer tube 10 and has a plurality of supporting legs 81. Each supporting leg 81 has a first surface 811 and a second surface 812, and the second surface 812 further has a recess 813. As shown in FIG. 8, each recess 813 is also provided with a pivoted grounding nail 82 which can be turned out or folded inwards.

In addition, the positioning member 40 is a tightening sleeve, and the threaded aperture 61 of the knob 60 is provided by a mounted nut. The knob 60 is provided with a stopping member 62, the bolt 53 is provided with a stopping edge 531, and the stopping member 62 jackets onto the bolt 53 and makes contact with the stopping edge 531 to prevent the knob 60 from falling off from the bolt 53. The stopping member 62 is a hollow sleeve with an inner stopping edge 621 and an opening 622. When the stopping member 62 enters is pushed into the knob 60, the opening 622 allows the inner stopping edge 621 to pass the stopping edge 531, which achieves the combination of the stopping member 62 and the bolt 53.

Figure 1:
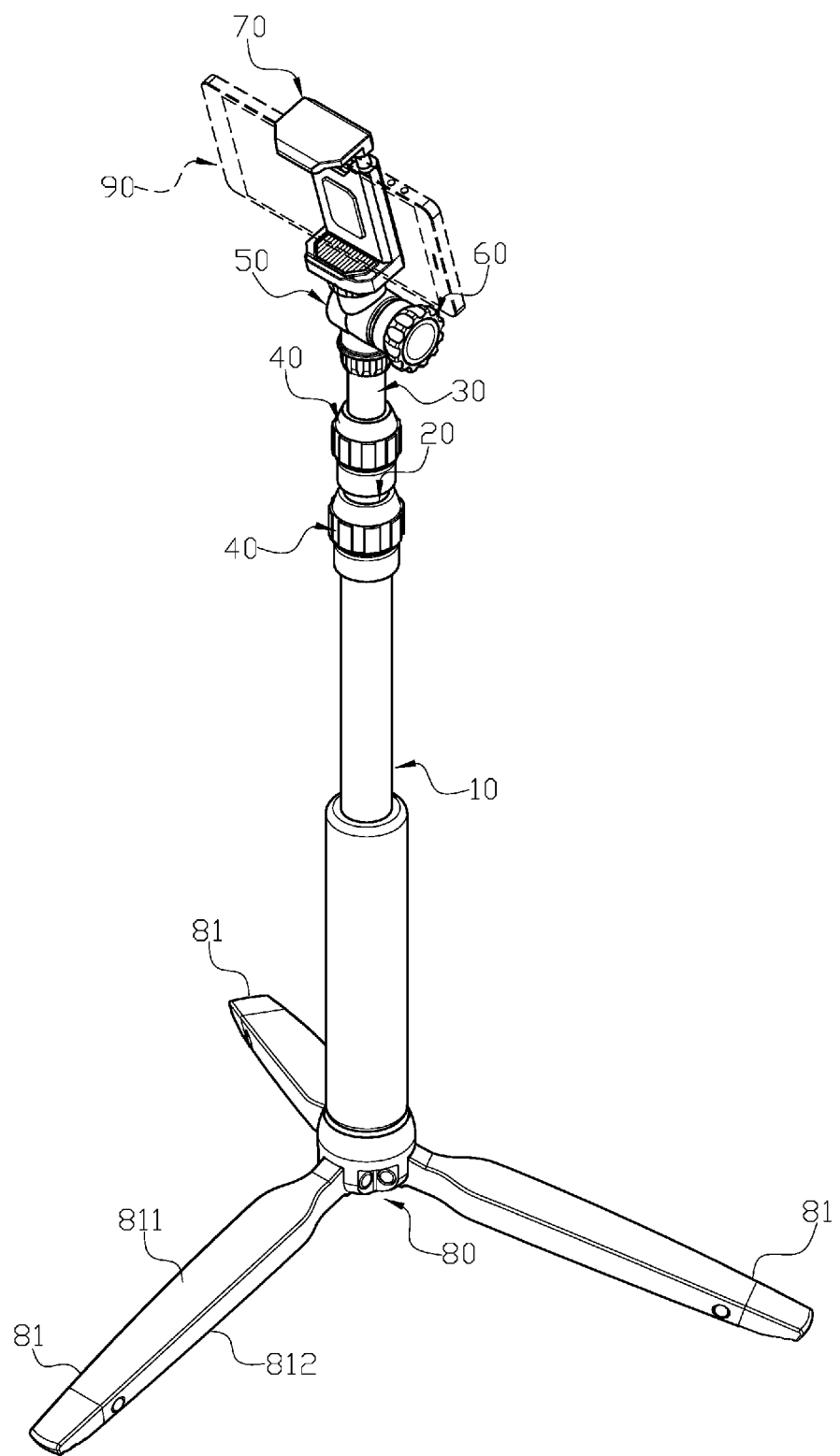
FIG. 1 is a perspective drawing according to a preferred embodiment of the present invention.
Figures 2, 5:
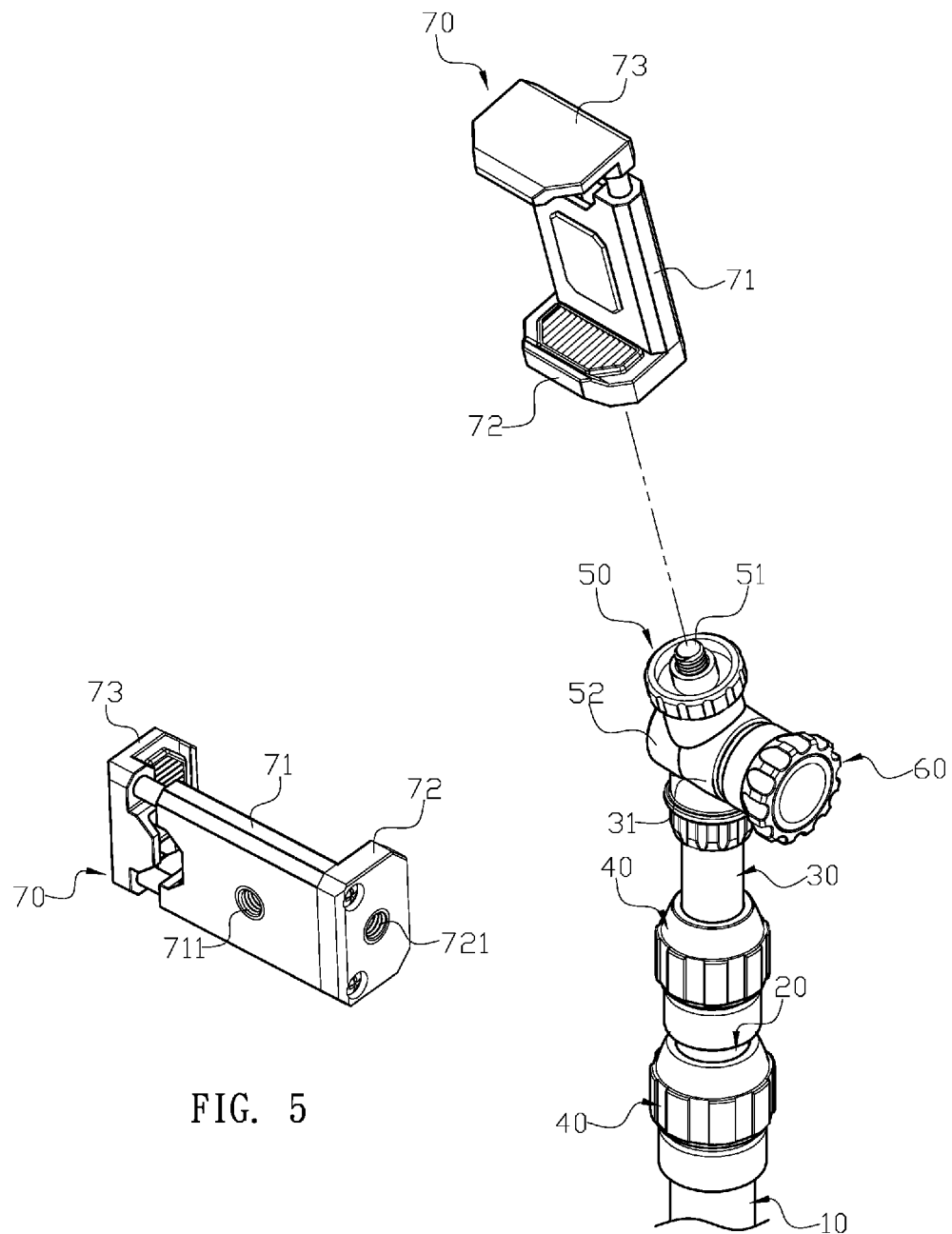
FIG. 2 is an exploded view of according to the embodiment of the present invention.
FIG. 5 is another perspective view of the clamping device knob according to the embodiment of the present invention.
Figure 3:
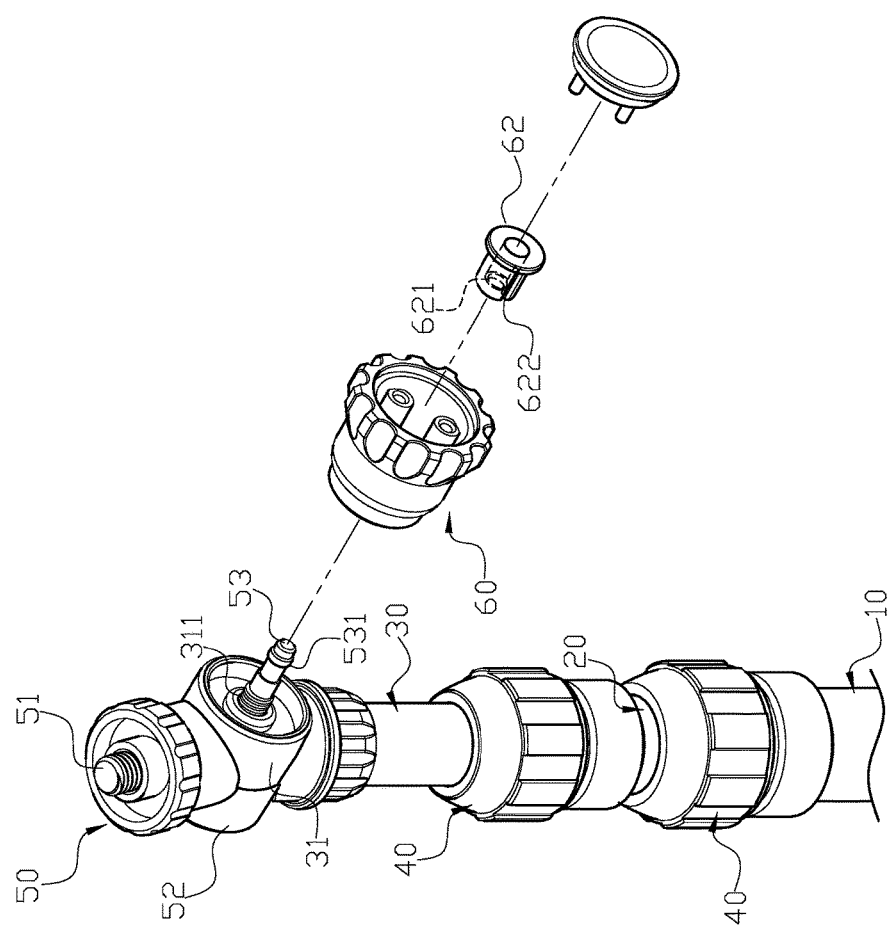
FIG. 3 is an exploded perspective view of the knob according to the embodiment of the present invention.
Figure 4:
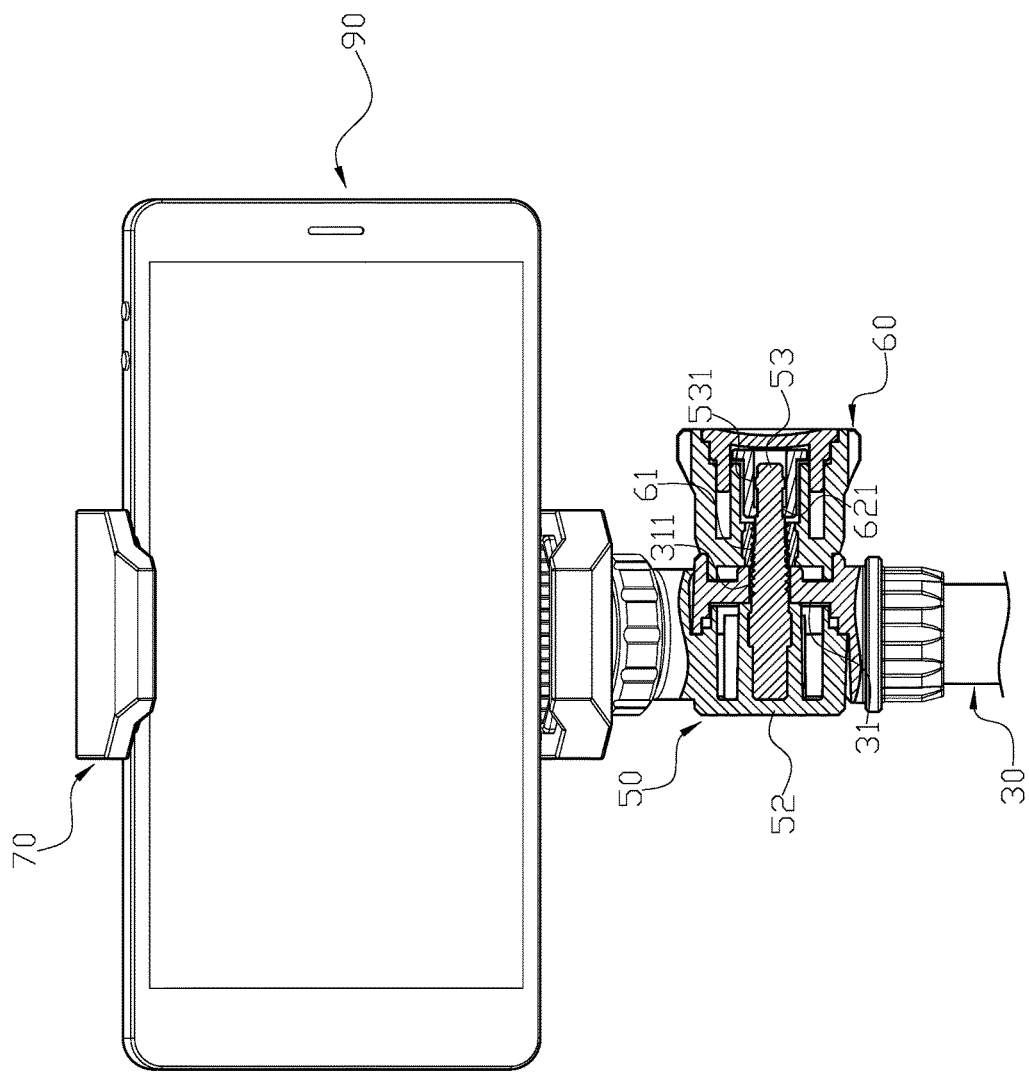
FIG. 4 is a partial sectional view knob according to the embodiment of the present invention.
Figure 6:
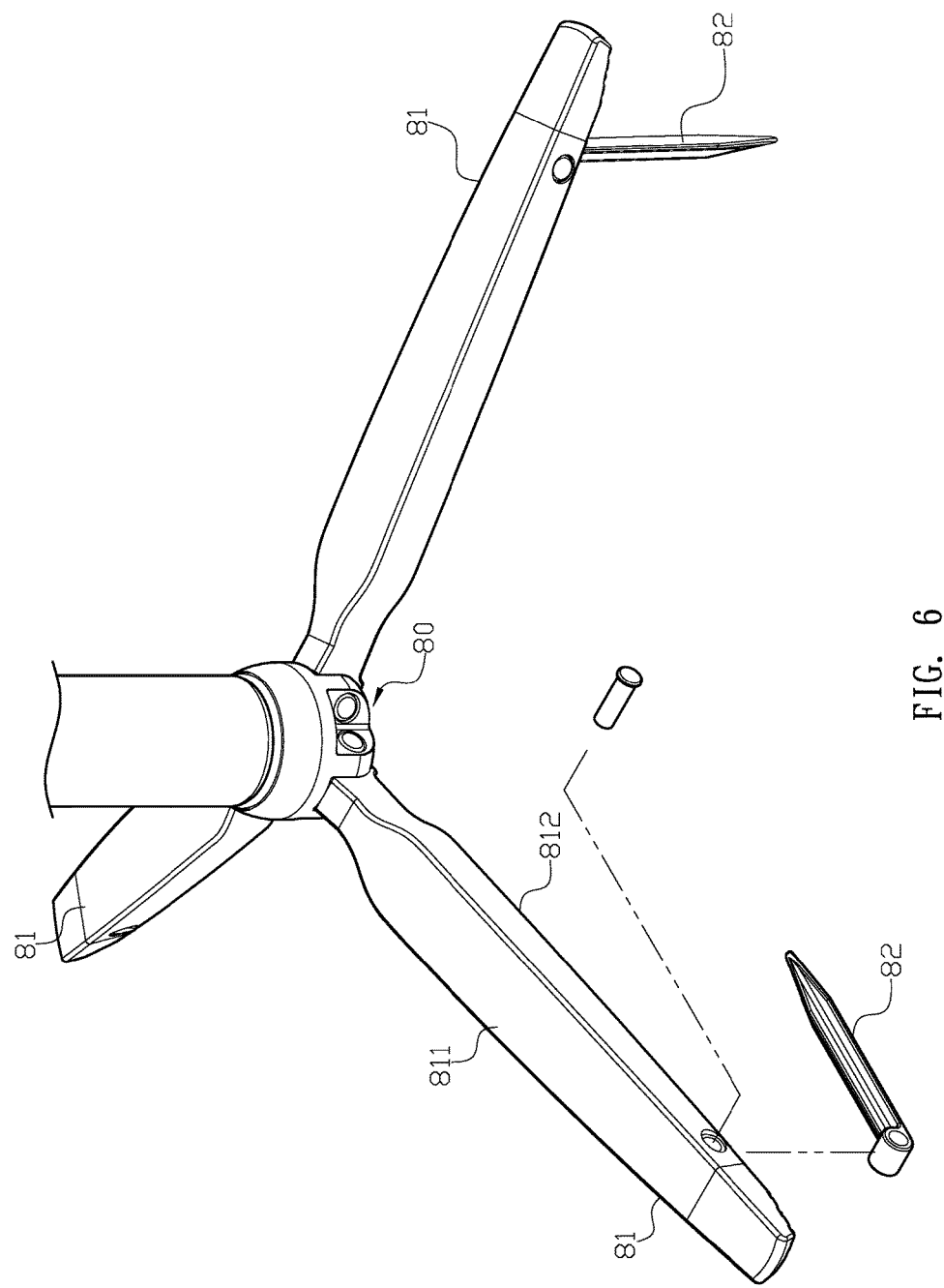
FIG. 6 is an exploded perspective view of the leg set according to the embodiment of the present invention.
Figure 7:
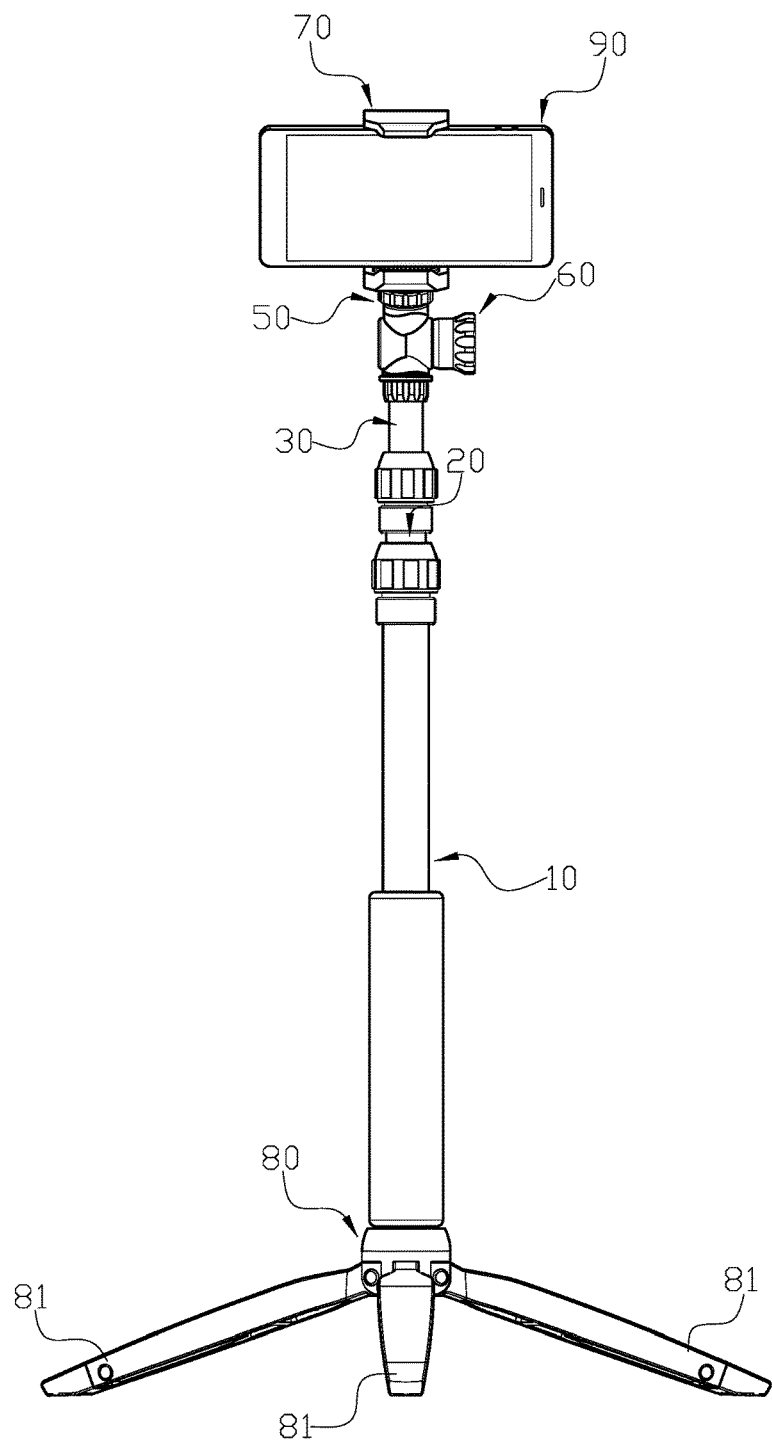
FIG. 7 is schematic drawing according to the embodiment of the present invention.
Figure 9:
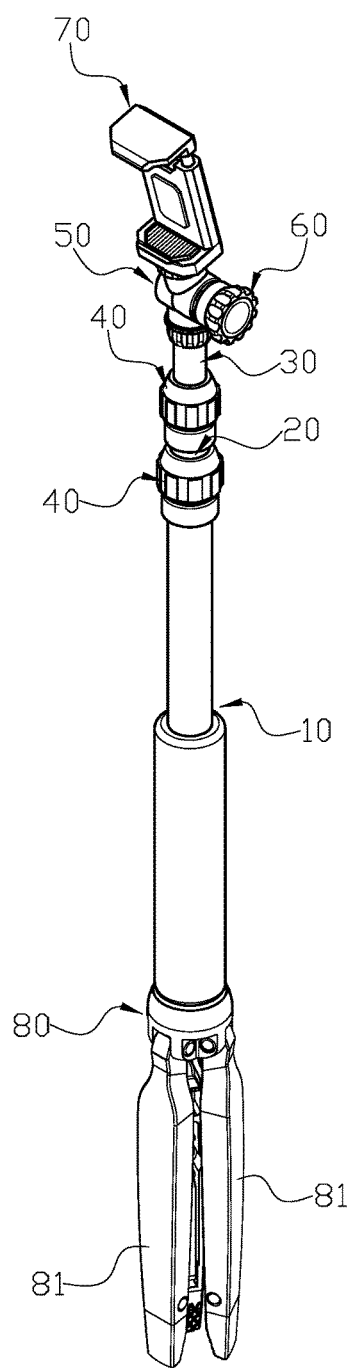
FIG. 9 is a state drawing showing the collapsed tripod according to the embodiment of the present invention.

For actual operation, first adjusting the length and swing angle of the tripod, then placing the image capture device 90 in the clamping device 70, and opening the supporting legs 81 to set up the tripod on the ground. The tripod lifts up the image capture device 90 which is suitable for recording and shooting the growth of plants, as shown in FIG. 7. In addition, the use of the grounding nail 82, as shown in FIG. 8, supports the tripod to be more stable. Furthermore, the intermediate tube 20, the inner tube 30 are able to retract and the supporting leg 81, the grounding nail 82 are able to fold back, shown in FIG. 9, to reduce its size, so that the tripod carrying or storing more convenient.

With the structure of the above specific embodiment, the following benefits can be obtained: The tripod structure is a tripod dedicated to the image capture device 90 especially for long time period image recording such as plant growth. The height and swing angle of the tripod are adjustable, so the tripod in actual use can be more handy. Last, the intermediate tube 20, the inner tube 30 sequentially retracted back and the supporting leg 81, the grounding nail 82 can be folded up to reduce its size, so that the tripod can be carried or stored more convenient and space-free.

Although the present invention has been explained in relation to its preferred embodiment, it is to be understood that many other possible modifications and variations can be made without departing from the spirit and scope of invention as hereinafter claimed.

What is claimed is:

1. A tripod comprising:
an outer tube, an intermediate tube, an inner tube, at least two positioning members, a connecting joint, a knob, a clamping device and a leg set, wherein:
the outer tube, the intermediate tube and the inner tube are sequentially and slidably sleeved onto each other, a first of the at least two positioning members is engaged between the outer tube and the intermediate tube, and a second of the at least two positioning members is engaged between the intermediate tube and the inner tube;
the inner tube is provided with a first engaging disk having a through aperture;
the connecting joint is provided with a locking rod and a second engaging disk having a bolt, the bolt passing through the through aperture of the first engaging disk such that the connecting joint is pivoted onto the first engaging disk of the inner tube;
the knob further includes a threaded aperture configured for engaging with the bolt extending from the first engaging disk, such that the connecting joint can be clamped and fixed onto the first engaging disk by the second engaging disk and the knob;
the clamping device comprises a back member, a side member and a slidable member, the back member and the side member are respectively provided with a first locking aperture and a second locking aperture configured for engaging with the locking rod of the connecting joint; and
the leg set is secured below the outer tube and includes a plurality of supporting legs, each supporting leg comprising a first surface and a second surface, and the second surface is provided with a recess with a pivoting grounding nail.

2. The tripod as claimed in claim 1, wherein each positioning member is a tightening sleeve.

3. The tripod as claimed in claim 1, wherein the threaded aperture of the knob is provided by a mounted nut.

4. The tripod as claimed in claim 1, wherein the knob is provided with a stopping member, the bolt is provided with a stopping edge, and the stopping member jackets onto the bolt and makes contact with the stopping edge to prevent the knob from falling off from the bolt.

5. The tripod as claimed in claim 4, wherein the stopping member is a hollow sleeve with an inner stopping edge and an opening.

* * * * *